Sept. 16, 1930.          E. BAGNALL          1,775,883
SPRING CONTROL
Filed Nov. 4, 1925

Inventor
Edwin Bagnall,
By
Attorneys

Patented Sept. 16, 1930

1,775,883

UNITED STATES PATENT OFFICE

EDWIN BAGNALL, OF TORONTO, ONTARIO, CANADA

SPRING CONTROL

Application filed November 4, 1925. Serial No. 66,858.

This invention relates to means for controlling or damping the action of vehicle springs whereby undesirable recoil may be subdued with consequent easier riding qualities in a spring so controlled.

More particularly the invention has for its object the provision of a simply constructed and easily applied device which will accomplish the said purposes and which may be applied to a spring without necessitating the dismantling of any part of the vehicle to which the springs are applied or of the springs from the vehicle.

A further object is to provide an attachment for leaf springs adapted to increase pressure between leaves of such a spring when the spring is flexed by the application of a load thereto, and which will modify the flexion of such spring under such circumstances in a manner reducing the tendency of the spring to oscillate or vibrate undesirably as is usual in spring constructions ordinarily used in vehicles. The invention is of a special benefit when applied to the springs of vehicles equipped with balloon tires and is intended to overcome the objectionable rocking of a vehicle which is characteristic of the use of balloon tires.

Still further objects subsidiary to or resulting from the aforesaid objects, or from the construction or operation of the invention as it may be carried into effect, will become apparent as the said invention is hereinafter further disclosed.

In carrying the said invention into effect I may provide a more or less resilient lever fulcrumed on a strap or member adapted to embrace a leaf spring proximate to one end thereof, the said lever being provided at either end with bearing members adapted to rest on the leaves of the spring to set up a pressure between two or more of the said leaves of the spring, and means whereby the pressure of the said bearing members may be adjusted.

All of which is more particularly described and ascertained hereinafter, by way of example, having reference to the accompanying drawing, wherein—

Figure 1 is an illustration in a fragmentary manner of part of a vehicle provided with a transverse leaf spring to which my improved spring control is applied;

Figure 2 similarly illustrates a downwardly bowed semi-elliptic spring equipped with the said controlling means;

Figure 4 is a similar view taken on the line $4^\times$—$4^\times$, Figure 1;

Figure 10 is a similar view taken on the line $10^\times$—$10^\times$, Figure 8;

Similar characters of reference indicate similar parts in the several figures of the drawing.

Figure 1:
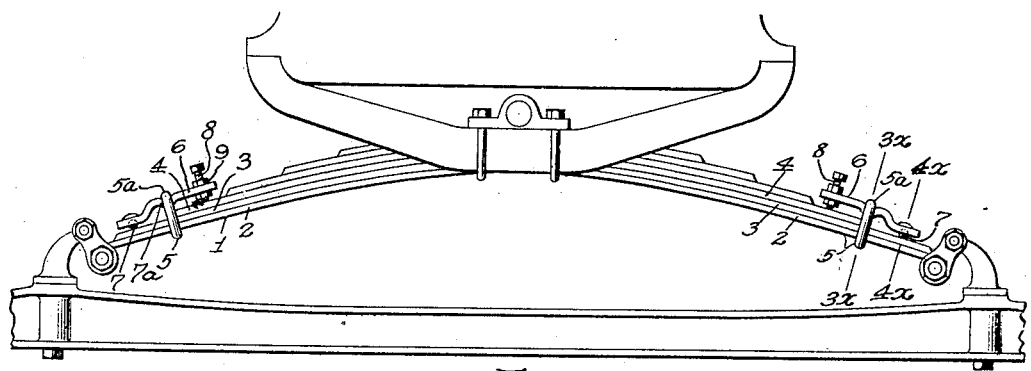

1 is an upwardly bowed leaf spring, the longer leaves 2, 3 and 4 of which are directly influenced by the controlling means, one of which is shown as applied to each end portion of the said leaf spring 1 and each of which devices comprises a clip or strap 5 embracing the leaf spring, in the present instance at a point adjacent the end of the leaf 4. The vertical dimensions of the said strap are substantially greater than the vertical dimensions of the spring at this point, so that a space is provided between the upper transverse portion $5^a$ of the said strap and the upper surface of the leaf 4 of the spring, and through this space a lever 6 extends, the said lever being indicated as being recessed at $7^a$ for fulcrumed engagement with the transverse member $5^a$ of the said strap 5, and the said recess preventing endwise displacement of the lever relevant to the said strap.

It is proposed to make the lever of the same material as the leaves of the spring, although somewhat heavier, so that it has a resilient quality, and at opposite ends of the said lever I arrange bearing members in the form of a ball 7 and set screw 8, the latter being adjustable in the said lever to increase or decrease the pressure of the bearing members on the leaf spring and provided with a lock nut 9 to secure it in adjusted positions.

The bearing member 7 rests on the end portion of the leaf 3 of the spring and the bearing member 8 on the end portion of the superimposed leaf 4 thereof so that it will be seen that, by adjustment of the set screw, pressure of the leaf 3 upon the leaf 2 and of the leaf 4 upon the said leaf 3 may be varied and friction between the said leaves governed according to requirements.

By so providing for the provision a predetermined friction between the leaves, a "lazy" action may be established in the spring which greatly reduces the tendency thereof to oscillate or vibrate in the manner which ordinarily produces an undesirable rocking motion in a vehicle, which motion is especially apparent in vehicles provided with balloon tires, and this tendency to rock varies with differences in the weight and design of vehicles and of the springs, and the adjustment referred to allows of the device being set to meet the degree of such tendency to be counteracted.

The pressing together of the leaves of the spring in this manner is not, however, the only factor which enters into the damping action of the device, as there are also set up points of contact between the device and the spring which modify the flexion of the spring when it is subject to a load, and by pressing upon the spring intermediate of its points of support and attachment to the vehicle the device causes a deflexion of the spring about the device which is somewhat in the nature of a counter flexing and sets up forces retarding reaction of the spring beyond its normal condition upon the rebound after a load has been applied to and removed therefrom. It is this reaction which is responsible for the objectionable rocking which it is the object of this invention to overcome.

Figure 2:
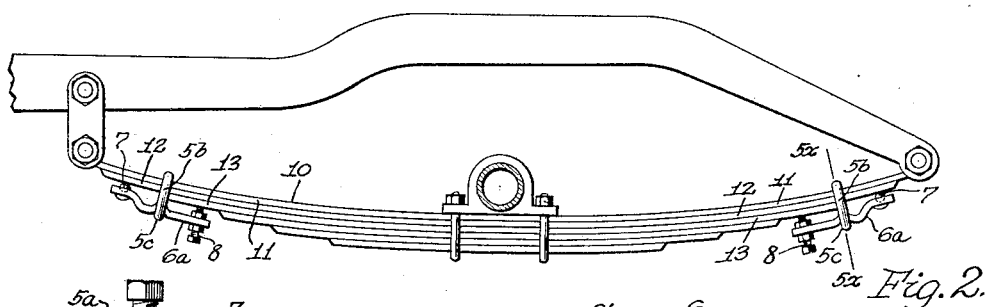
Figure 3:
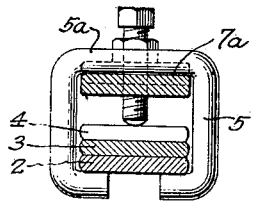
Figure 3 is a detail transverse sectional view taken on the line $3^\times$—$3^\times$, Figure 1.
Figure 5:
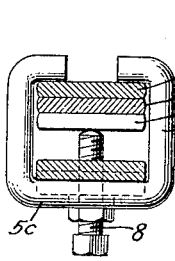
Figure 5 is a similar view taken on the line $5^\times$—$5^\times$, Figure 2.

In Figure 2 a downwardly bowed semielliptic spring 10 is shown. The longer leaves 11, 12 and 13 are subjected to the controlling action of a device similar to that shown in Figure 1, except that it is inverted, the transverse member 5$^c$ of the strap 5$^b$ being spaced from the underside of the said spring and the lever 6$^a$ passing over the said transverse member and provided with bearing members 7 and 8, as in the first described construction, in the form of a ball and a set screw engaging the end portions of the leaves 12 and 13 respectively of the leaf spring 10.

Figure 7:
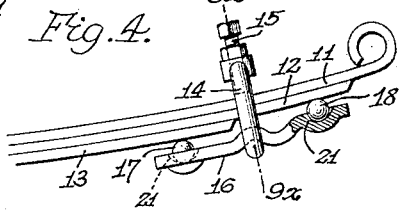
Figure 7 is a fragmentary view of a leaf spring showing a modified form of control device applied thereto.
Figure 9:
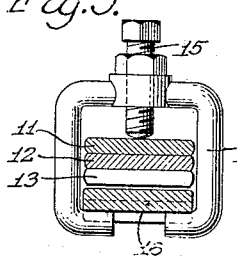
Figure 9 is a sectional detail view taken on the line $9^\times$—$9^\times$, Figure 7.

In the arrangement shown in Figure 7 a strap 14 is shown provided with a set screw 15 and a lever 16 is provided with bearing members at each end but in the form of balls 17 and 18, pressure of the said bearing members against the leaves of the spring being regulated by the said set screw 15 of the strap 14.

Figure 8:
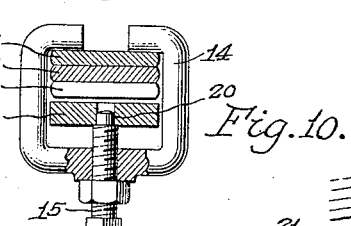
Figure 8 is a similar view illustrating a still further modification of the device.
Figure 6:
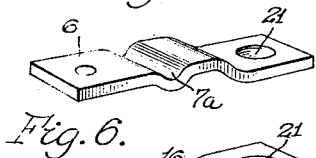
Figure 6 is a detail perspective view of the lever element of the control device, Figure 1, removed.
Figure 11:
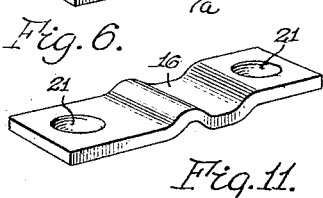
Figure 11 is a detail perspective view of the lever element of the device, Figure 7, removed.
Figure 12:
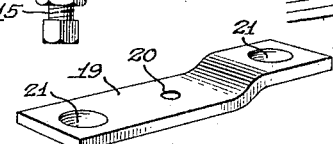
Figure 12 is a similar view of the lever element of the device, Figure 8.

In the arrangement shown in Figure 8 the strap 14 is inverted from the position shown in Figure 7 so that the set screw 15 is on the same side of the spring as the lever 19 which in this case is suitably recessed for the accommodation of the inner end of the set screw at 20 and is provided with ball bearing members 17 and 18 as in the arrangement shown in Figure 7.

In each of these cases the lever is suitably recessed as at 21 for the retention of the ball bearing member, the recess being such that it permits of a certain rolling movement of the ball bearing member so that sliding friction between the bearing members and the leaves of the spring in action is reduced to a minimum.

The simplicity of the device from a manufacturing standpoint is very apparent and its application to a spring may be easily effected by simply passing the strap over the thin end of the spring and then moving the strap to the position which it is to occupy, entering the lever into the strap, placing the ball bearing member or members in position and finally tightening the set screw to secure the desired pressure of the bearing members on the leaves of the spring.

This invention may be developed within the scope of the following claims without departing from the essential features of the said invention, and it is desired that the specification and drawing be read as merely illustrative and not in a limiting sense, except as necessitated by the prior art.

What I claim is:—

1. Spring damping means comprising a strap adapted to embrace and engage one side of a vehicle spring, a continuous one-piece rigid lever supported intermediate its ends by said strap and extending longitudinally of said spring in spaced relation to the side thereof opposite that engaged by the strap, the ends of said lever having support from said side of said spring, and means for adjustably regulating the pressure exerted by said lever upon said spring through the end supports for said lever.

2. Spring damping means comprising a strap to embrace a leaf spring and engage the base leaf of said spring, a rigid lever supported intermediate its ends by said strap in spaced relation to the side of the spring at which the auxiliary leaves thereof are located, said lever extending longitudinally of the spring, bearing members at the ends of said lever to engage the end portions of the auxiliary leaves, and means for adjustably regulating the force to which said bearing members engage said levers.

3. Spring damping means characterized as in claim 2, and wherein at least one of said bearing members is in the form of a ball capable of restricted rolling movement between said lever and spring.

4. In combination with a laminated leaf spring, damping means comprising a strap embracing the spring and bearing upon the main leaf thereof, a rigid lever inserted through the loop of said strap and engaged therewith intermediate its ends, said lever extending longitudinally of the spring in spaced relation to the side of the spring at which the auxiliary leaves are located, abutments at the ends of said lever to engage the end portions of the auxiliary leaves of the spring, and means for adjusting at least one of said abutments to vary the pressure exerted by the lever against said auxiliary leaves.

5. The combination with a laminated leaf spring, of damping means comprising a split strap embracing said spring with its split ends bearing upon the main leaf of the spring, a rigid lever passing through the loop of said strap and supported thereby intermediate its ends with said lever extending longitudinally of the spring in spaced relation to the side of the spring at which the auxiliary leaves are located, a ball abutment carried by one end of said lever to engage an end portion of an auxiliary leaf, and an adjustable member for engaging an end portion of another auxiliary leaf and adapted to rock said bar upon said strap and regulate the pressure exerted by said lever upon said auxiliary leaves.

In testimony whereof I affix my signature.

EDWIN BAGNALL.